July 22, 1952  G. E. ARMINGTON  2,604,177
DRIVE CONTROL FOR TRACTOR-TRAILER UNIT
Filed Oct. 19, 1946  4 Sheets-Sheet 1

INVENTOR
GEORGE E. ARMINGTON
By Hyde, Meyer, Baldwin & Doran
ATTORNEYS

July 22, 1952   G. E. ARMINGTON   2,604,177
DRIVE CONTROL FOR TRACTOR-TRAILER UNIT
Filed Oct. 19, 1946   4 Sheets-Sheet 3

INVENTOR
GEORGE E. ARMINGTON
By Hyde, Meyer, Baldwin & Doran
ATTORNEYS

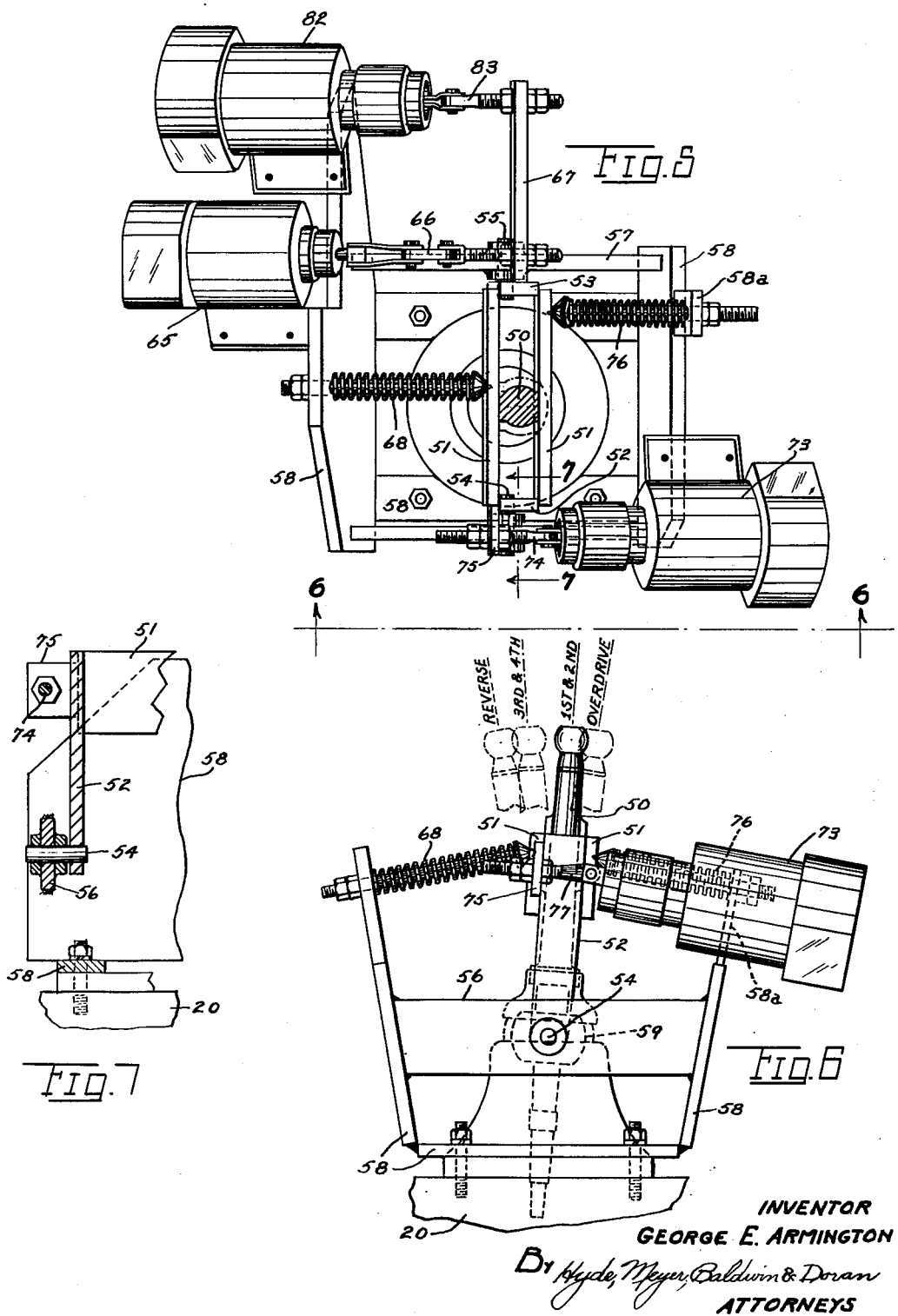

Patented July 22, 1952

2,604,177

UNITED STATES PATENT OFFICE 2,604,177

DRIVE CONTROL FOR TRACTOR-TRAILER UNIT

George E. Armington, South Euclid, Ohio, assignor to The Euclid Road Machinery Co., Euclid, Ohio, a corporation of Ohio Application October 19, 1946, Serial No. 704,459

6 Claims. (Cl. 180—12)

This invention relates to improvements in a drive control for a tractor-trailer unit.

An object of the present invention is to provide an improved arrangement where the driver of a tractor-trailer unit may be seated upon the trailer with provision for complete control of the tractor in a novel manner, so that the driver may more readily control the combined vehicle.

Another object of the present invention is related to a novel tractor-trailer combination wherein the trailer is connected to the tractor by means of a hitch providing a substantially vertically extending pivot, and tractor control means extending from the driver's seat on the trailer through this pivot connection of the hitch to the control devices on the tractor, whereby an efficient control mechanism is provided in novel combination with the tractor-trailer hitch.

Other novel features of the invention include novel control devices having cooperative parts on the trailer adjacent the driver's seat and on the tractor at the control point, whereby to carry out the purposes of my invention.

Other novel features of my invention will be apparent from the accompanying drawings and specification, and the essential features thereof will be set forth in the appended claims.

In the drawings:

Fig. 5 is an enlarged view taken along the line 5—5 of Fig. 3;

Fig. 6 is an end elevational view of the device of Fig. 5 taken from approximately the line 6—6 of Fig. 5;

Fig. 7 is a fragmental sectional view taken along the line 7—7 of Fig. 5;

Fig. 8 is an enlarged side elevational view of the control lever of Fig. 3 adjacent the driver's seat, parts being broken away to more clearly show the construction; while Fig. 9 is a diagrammatic view of the electrical portion of the control system.

Figure 1:
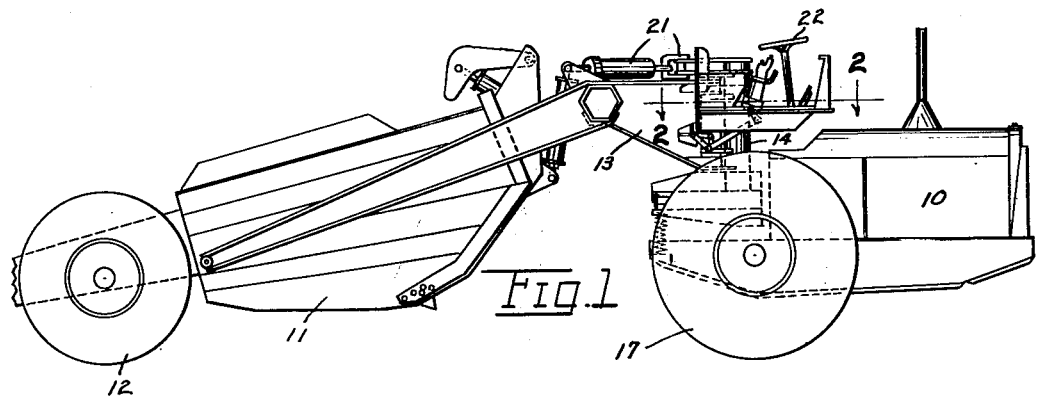
Fig. 1 is a side elevational view of a tractor-trailer vehicle embodying my invention.

The device shown in Fig. 1 comprises a tractor 10 and a trailer vehicle 11 which, in the present instance, happens to be a carrying scraper, but it should be understood that I desire to include any trailer device coupled to any tractor. The trailer is supported by one or more rear wheels 12 and a hitch connected with the trailer drawbar 13. The details of this hitch are fully disclosed in my United States Patent No. 2,460,725, granted February 1, 1949, to which reference may be had if necessary. Suffice it to say here that a post 14 is mounted on the tractor and is provided with upper and lower ears 15 rigidly connected with the post and supporting pivot pins 16a and 16b vertically alined with each other and providing a substantially vertical axis for oscillation of the drawbar 13 and vehicle 11, relative to the tractor. My above-mentioned patent shows pivot pins there are marked 30a and 30b and here marked 130a and 130b and providing a second pivotal connection between the tractor and trailer on a horizontal axis on the fore-and-aft center line of the tractor and trailer.

Figure 2:
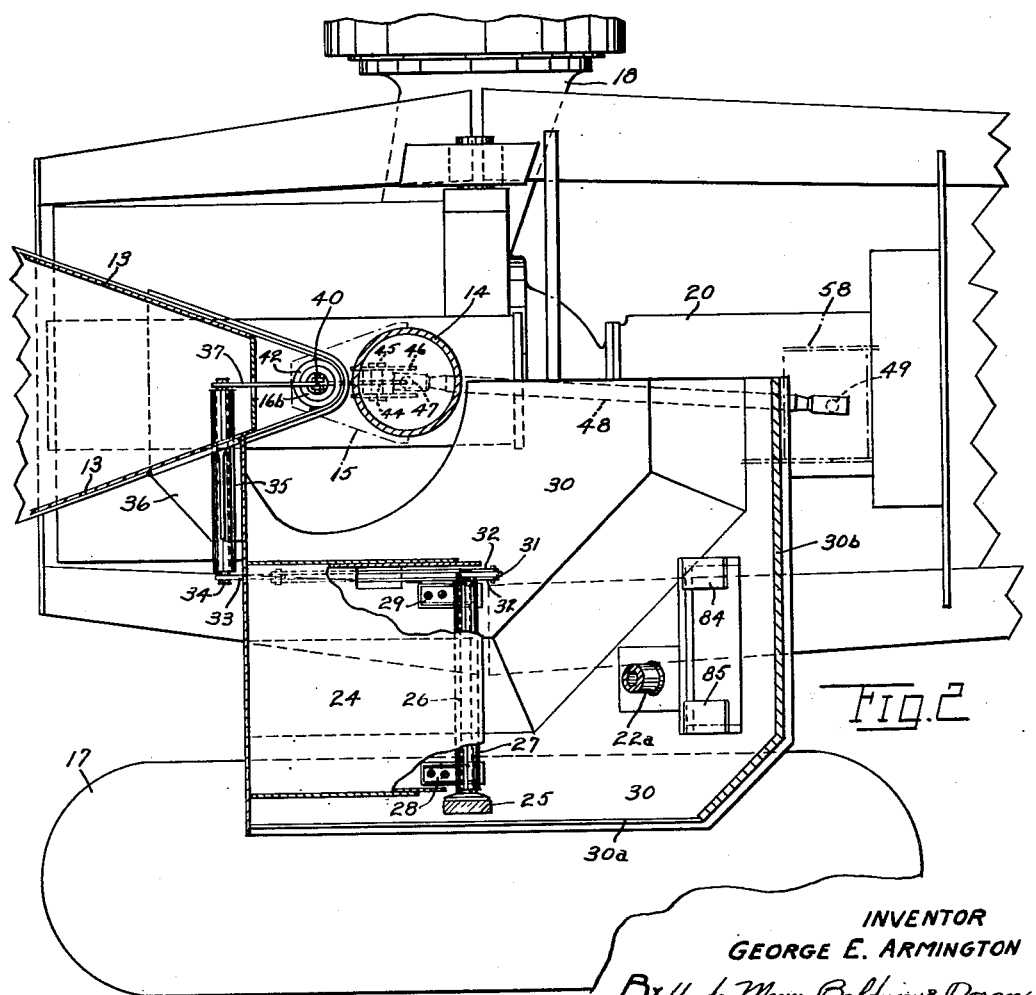
Fig. 2 is an enlarged sectional view taken along the line 2—2 of Fig. 1. This view is also indicated by the line 2—2 of Fig. 3.

The tractor 10 is supported on a pair of wheels 17 mounted on an axle housing 18 which houses drive means which is connected with the tractor engine 19 in the usual manner, through a gear changing mechanism of standard construction which is located within the housing 20. Only one of the wheels 17 is shown in Fig. 2, but the other wheel is located parallel thereto and at the same distance from the center of the post 14. The steering mechanism indicated at 21 is exactly like that shown in my copending application, Serial No. 669,906, filed May 15, 1946, now Patent No. 2,557,066, to which reference may be had for a fuller description of the same. This steering mechanism is under control of the steering wheel 22 which operates a link 23 as taught in the last mentioned copending application.

In a combined vehicle of this sort, it is customary to place the driver on the tractor, but this leads to difficulties in large vehicles, because the combined vehicle may deviate from the desired path of travel for some little time before the driver is aware of the same, because he has only the hood portion of the tractor in front of him and all of the rest of the vehicle is behind him, usually including the hitch about which the articulation of the vehicle occurs. In my improved construction, the driver's seat 24 is placed high up on the trailer portion of the vehicle so that any movement of the tractor relative to the trailer is immediately apparent to the driver who can correct such movement if he finds it necessary. There are difficulties connected with this position of the driver's seat which it is the aim of the present invention to solve.

One of these difficulties relates to the changing of gears, such difficulty arising from the fact that the control must be initiated on the trailer vehicle, while the gear-changing mechanism must be located on the tractor vehicle. Since the two vehicles are constantly changing position relative to each other, means must be provided to control the tractor at all times, and in all relative positions of the tractor and trailer. To this end, I have mounted the gear-changing control handle 25 at the forward right-hand corner of the driver's seat 24. The lower end of this handle is fixed to a shaft 26 which runs horizontally in front of the driver's seat through a bearing sleeve 27 which in turn is mounted by brackets 28 and 29 on the floor 30 of the driver's platform. At the end of shaft 26, opposite handle 25, there is rigidly secured a crank arm 31 which is connected by two parallel links 32 with a crank arm 33 which is movable with a shaft 34. This shaft is mounted in a sleeve 35 which is mounted by means of bracket 36 on the drawbar 13. On the opposite end of shaft 35 is rigidly connected an arm 37 which extends forwardly to a pivot point 38 where a link 39 is connected by means of a clevis 40. This link, as clearly shown in Figs. 3 and 4 extends through the hollow center of the pivot pin 16b. The pin is provided with a bearing 41 which is held in a sleeve 42, which in turn is rigid with the drawbar 13. The lower end of link 39 is connected by a ball and socket joint 43, located approximately on the axis of pins 130a and 130b, with a bell crank 44 pivotally mounted at 45 on bracket 46, connected with the tractor frame. The other arm of this bell crank has a ball and socket connection 47 with a link 48 which extends forwardly to a ball and socket connection 49 with the gear shift lever 50.

Figure 3:
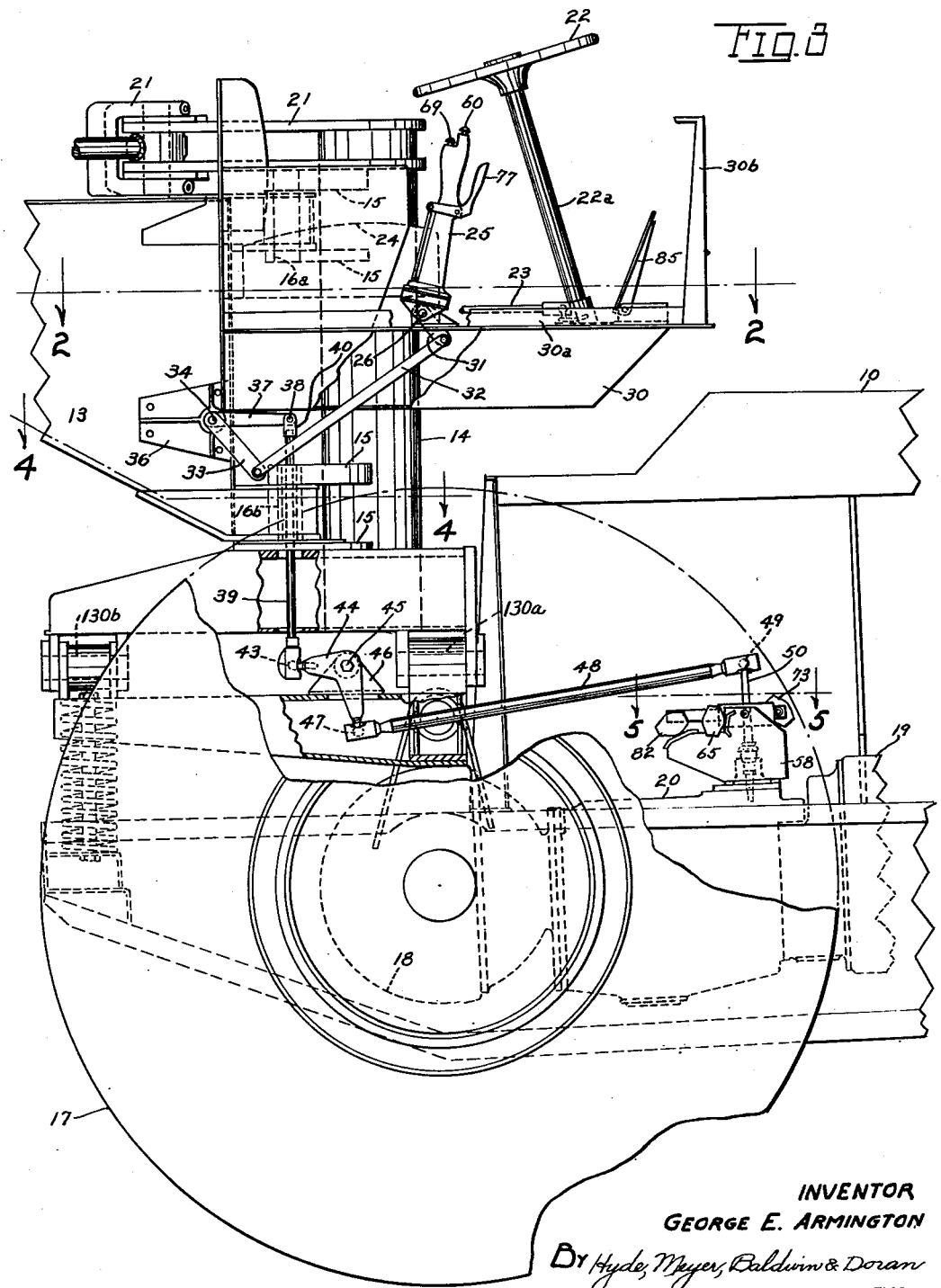
Fig. 3 is an enlarged side elevational view of a portion of Fig. 1 with parts broken away to more clearly show the construction.
Figure 4:
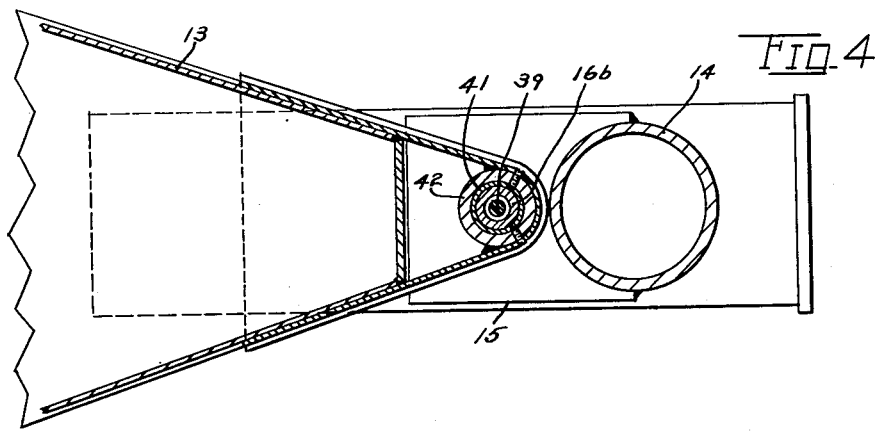
Fig. 4 is a sectional view taken along the line 4—4 of Fig. 3.
Figures 8, 9:
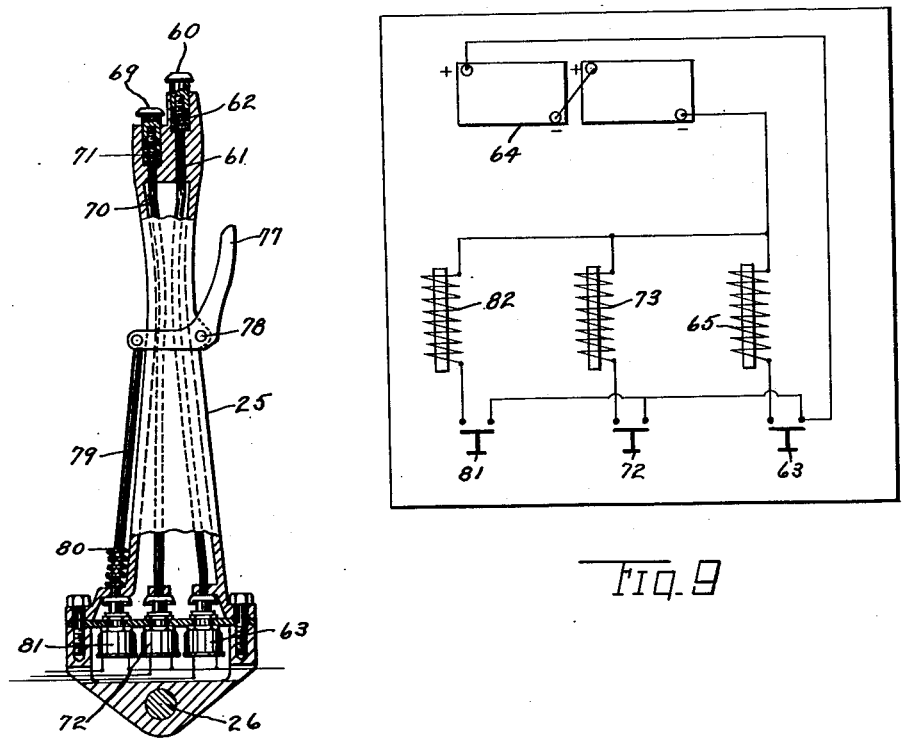

The gear shifting devices are partly electrical and partly mechanical and are clearly shown in Figs. 5, 6 and 7, taken with the disclosures of Figs. 3, 8 and 9. The gear shift lever 50 controls the gears in the housing 20 in a standard manner and it is believed wholly unnecessary here to show the gears themselves. Referring to Fig. 6, in the normal position of lever 50, indicated in full lines, the lever 50 may be rocked back and forth to select first and second gear. In the dot-dash position to the left of the first and second gear position, third and fourth gear positions may be selected. Still further to the left, indicated in dotted lines in Fig. 6, is the reverse gear position, while to the right of the first position, as indicated in dash lines of Fig. 6, is an overdrive position. I rely on mechanical movement to move lever 50 out of neutral position into a gear-engaging position when in any of the predetermined neutral positions of Fig. 6, whereas, I rely upon electrical means for moving the lever 50 to the various lateral positions indicated in Fig. 6.

Referring to Figs. 5, 6 and 7, the lever 50 is slidable between two parallel bars 51 which are rigidly connected with downwardly extending end pieces 52 and 53. These end plates are pivotally mounted at 54 and 55, respectively, on alined pivot pins carried by the cross pieces 56 and 57, respectively, which are rigidly secured to the bracket 58. The pivots 54 and 55 are alined with the center of oscillation of a ball and socket joint 59 about which the lever 50 oscillates. It results from the above construction that the frame 51, 52, 53, oscillates freely from side to side carrying the lever 50 with it, and in any position of the frame, the lever 50 may be freely oscillated along the bars 51.

Electrical means is provided for placing the frame 51, 52, 53 in any desired position at the will of the driver. This means comprises three electrical solenoids connected with the frame assisted by two springs, as will presently appear. When all of the solenoids are deenergized and when the two springs are unstressed, the parts are in the position of Fig. 5, and the full line position of Fig. 6. This is the position corresponding to first and second gear and is the position normally desired by the operator upon starting the vehicle. When the operator desires to shift the third and fourth gear, he depresses button 60 at the upper end of lever 25 adjacent the driver's seat. As shown in Fig. 8, this depresses rod 61 against the tension of spring 62 to make contact in switch 63 located at the base of the lever 25. This switch is shown diagrammatically in Fig. 9 as completing a circuit from a battery 64 (or other suitable source of power) through solenoid 65 which, as shown in Fig. 5, is connected by linkage 66 with an arm 67 rigid with the end plate 53. When energized, solenoid 65 moves linkage 66 and plate 67 toward the left, as viewed in Fig. 5, until lever 50 occupies the dot-dash position of Fig. 6. When in this position, the lever 50 may be shifted out of its neutral position shown in Fig. 5, either forward or backward to select third and fourth gears, respectively, at the desire of the driver. At the time solenoid 65 was energized to move linkage 66 toward the left, as viewed in Fig. 5, a helical spring 68 was compressed between bar 51 and bracket 58. This spring is just strong enough so that when solenoid 65 is deenergized it will return the frame 51, 52, 53 to the position of Fig. 5, if lever 50 is in neutral. Obviously, if lever 50 is in either third or fourth gear, the parts will remain in that position until lever 50 is returned to neutral.

The tractor is equipped with an overdrive, and to shift into this overdrive position, the operator depresses button 69 on the top of lever 25 so as to depress rod 70 against the tension of spring 71. This closes the contacts in switch 72 which, as shown diagrammatically in Fig. 9, closes the energizing circuit for solenoid 73. Referring to Fig. 5, it will be noted that solenoid 73 is connected by linkage 74 with an arm 75 which is rigid with the gear shifting frame. This moves the frame toward the right as viewed in Figs. 5 and 6 to the dash position of lever 50 shown in Fig. 6, if lever 50 is in neutral. When solenoid 73 has so shifted lever 50 it may then be moved forward or backward to the necessary position to engage the overdrive. Here again, when the gear shifting frame was moved toward the right, as viewed in Fig. 5, it placed spring 76 in compression between bar 51 and an ear 58a of bracket 58. The spring 76 is just sufficiently strong enough to return the gear shifting frame to a definite neutral position, the position shown in Fig. 5, when solenoid 73 is deenergized, when lever 50 is in neutral position.

For selecting the reverse position of the gear shifting lever, the operator is provided with a handle 77 pivotally mounted at 78 on the lever 25. When the handle 77 is moved in counterclockwise direction, as viewed in Fig. 8, the rod 79 is depressed against the tension of spring 80 so as to close the contacts of switch 81. This switch, as shown diagrammatically in Fig. 9, completes the electrical circuit through solenoid 82. Referring to Fig. 5, it will be noted that solenoid 82 is connected by linkage 83 with the arm 67. Energization of this solenoid moves the gear shifting frame 51, 52, 53 toward the left, as viewed in Figs. 5 and 6, to position the lever 50 in the extreme left or dotted position indicated in Fig. 6. When in this position, the lever 50 may be shifted in the direction to engage the reverse gear. Here again, the spring 68 is compressed when lever 50 is moved toward the left and serves to return the gear shifting frame to the position of Fig. 5 when the reverse solenoid is deenergized and lever 50 is returned to neutral position.

The driver's platform 30 and the support for the seat 24 is connected by welding and suitable bracing plates to the drawbar 13. Around the edge of the platform is a footboard 30a and in front of the driver is a railing 30b. Suitable brake and accelerator pedals 84 and 85 are positioned for the feet of the operator adjacent the base of the steering column 22a. These pedals are connected by means not shown with the parts which they control. It results from the above construction that the driver sits in an elevated seat where he has an unobstructed view in all directions and where he can easily control the speed, the steering, and the gear shifting in an efficient manner. The least deviation of the tractor off the desired line of travel is easily detected and corrected. The gear shifting can be accomplished in all relative positions of the tractor and trailer because the positioning of the link 39 on the vertical pivotal axis of the hitch together with the ball and socket connections 43, 47 and 49 permits gear shifting in all relative positions of the tractor and trailer. The novel arrangement of the solenoids for controlling the position of the gear shifting frame 51, 52, 53 together with the mechanical shifting of lever 50 for the selection of gears aids in the satisfactory control of the vehicle.

What I claim is:

1. In combination, a tractor, a trailer, a pivotal connection between said tractor and trailer on a substantially vertical axis, a second pivotal connection between said tractor and trailer on a substantially horizontal axis on the fore-and-aft center line of said tractor and trailer, a gear shifting control member on said tractor, a driver-controlled member on said trailer above said pivotal connection, and a train of mechanically connected parts operatively connected between said members, said parts including a link passing downwardly through said pivotal connection and a ball and socket joint therebelow approximately on said center line, whereby said train of parts is operative in all relative operating positions of said tractor and trailer.

2. In the combination of a tractor and a trailer and a pivotal hitch connection between them, a driver's seat on said trailer, a gear shifting lever on said tractor having a plurality of neutral positions and shiftable from each of said positions into a different gear-engaging position, a control lever on said trailer adjacent said driver's seat, electrical means for moving said gear shifting lever to a predetermined neutral position, control means for said electrical means associated with said control lever, and means operatively connecting said control lever with said gear shifting lever for moving the latter into a gear-engaging position.

3. In the combination of a tractor and trailer and a pivotal hitch connection between them, a driver's seat on said trailer; gear shifting means on said tractor having a plurality of neutral positions and shiftable from each of said positions into a different gear engaging position; means controlled from the driver's seat for moving said gear shifting means to a predetermined neutral position, said last mentioned means including a movable guide frame on said tractor to shift said gear shifting means to said predetermined position of the plurality of neutral positions, and including an electrical device on said tractor for moving said guide frame to said predetermined position; and other means controlled from the driver's seat for moving said gear shifting means into a gear engaging position from said predetermined neutral position.

4. In the combination of a tractor and a trailer and a pivotal hitch connection between them, a driver's seat on said trailer; gear shifting means on said tractor having a plurality of neutral positions in one plane and shiftable from each of said positions into a different gear engaging position, the path of movement from the neutral to the gear engaging position forming an angle with said plane; means controlled from the driver's seat for moving said gear shifting means to a predetermined neutral position, said last mentioned means including a movable guide frame on said tractor to shift said gear shifting means to said predetermined position of the plurality of neutral positions, and including a plurality of electrical devices operatively connected to said frame, each device adapted when energized to move said guide frame to one of said neutral positions; and other means controlled from the driver's seat for moving said gear shifting means into a gear engaging position from said predetermined neutral position.

5. In the combination of a tractor and a trailer and a pivotal connection between them, a driver's seat on said trailer; gear shifting means on said tractor having a plurality of neutral positions in one plane and shiftable from each of said positions into a different gear engaging position, the path of movement from the neutral to the gear engaging position forming an angle with said plane; means controlled from the driver's seat for moving said gear shifting means to a predetermined neutral position, said last mentioned means including a movable guide frame on said tractor to shift said gear shifting means to said predetermined position of the plurality of neutral positions, and including an electrical device on said tractor operatively connected to said frame and adapted when energized to move said guide frame to said predetermined neutral position, and means operatively connected to said frame to return said gear shifting means to a definite neutral position when said device is de-energized and when said gear shifting means is in any of said neutral positions; and other means controlled from the driver's seat for moving said gear shifting means into a gear engaging position from said predetermined neutral position.

6. In a vehicle, a tractor having a pair of axially alined steerable wheels and having a frame supporting the tractor motor extending well forward of said wheels in cantilever fashion, a trailer, a pivotal hitch connection between said tractor and trailer generally alined between said wheels, a seat for the driver on said trailer above said tractor so positioned that a driver sitting in said seat may see the projecting cantilever front end of said tractor and the ground closely surrounding it, and control means for said tractor operable from said driver's seat, whereby the driver may immediately detect changes in the direction of tractor movement and control the same by looking down upon the cantilever front end of said tractor and by comparing the relative position of the front end with the ground.

GEORGE E. ARMINGTON.

REFERENCES CITED

The following references are of record in the file of this patent:

UNITED STATES PATENTS

| Number | Name | Date |
|---|---|---|
| 938,094 | Viguie et al. | Oct. 26, 1909 |
| 948,317 | Fuller | Feb. 8, 1910 |
| 1,073,775 | Michaud | Sept. 23, 1913 |
| 1,433,072 | Coulier | Oct. 24, 1922 |
| 1,640,808 | Ruck | Aug. 30, 1927 |
| 2,219,533 | Ross | Oct. 29, 1940 |
| 2,242,542 | Peterson et al. | May 20, 1941 |
| 2,291,626 | Huber | Aug. 4, 1942 |
| 2,361,935 | French | Nov. 7, 1944 |
| 2,368,202 | Clark | Jan. 30, 1945 |
| 2,384,890 | Coldwell | Sept. 18, 1945 |
| 2,422,813 | Walch | June 24, 1947 |
| 2,460,725 | Armington | Feb. 1, 1949 |

FOREIGN PATENTS

| Number | Country | Date |
|---|---|---|
| 15,277 | Great Britain | July 18, 1908 |
| 661,369 | France | Mar. 4, 1929 |